United States Patent
Yamada et al.

(10) Patent No.: US 10,397,248 B2
(45) Date of Patent: Aug. 27, 2019

(54) METHOD AND APPARATUS FOR MONITORING NETWORK

(71) Applicant: FUJITSU LIMITED, Kawasaki-shi, Kanagawa (JP)

(72) Inventors: Masahiro Yamada, Kawasaki (JP); Masanobu Morinaga, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 10 days.

(21) Appl. No.: 15/262,803

(22) Filed: Sep. 12, 2016

(65) Prior Publication Data

US 2017/0078312 A1    Mar. 16, 2017

(30) Foreign Application Priority Data

Sep. 15, 2015  (JP) .................................. 2015-182298

(51) Int. Cl.
*G06F 11/00* (2006.01)
*H04L 29/06* (2006.01)
*G06F 12/14* (2006.01)
*H04L 12/26* (2006.01)

(52) U.S. Cl.
CPC ...... *H04L 63/1416* (2013.01); *H04L 43/0852* (2013.01); *H04L 43/16* (2013.01)

(58) Field of Classification Search
CPC . H04L 43/16; H04L 63/1416; H04L 43/0852; H04L 43/062; H04L 43/12; H04L 43/10
USPC ........ 370/252, 235, 468, 217, 230; 709/225, 709/226, 229; 726/23
See application file for complete search history.

(56) References Cited

U.S. PATENT DOCUMENTS

| | | | |
|---|---|---|---|
| 7,610,624 B1 * | 10/2009 | Brothers | H04L 63/145 709/223 |
| 8,789,176 B1 * | 7/2014 | Brandwine | H04L 63/02 713/182 |
| 2009/0245103 A1 * | 10/2009 | Miyazaki | H04L 41/0677 370/229 |
| 2012/0005743 A1 | 1/2012 | Kitazawa et al. | |
| 2012/0324573 A1 * | 12/2012 | Kim | H04L 63/1458 726/22 |
| 2013/0227170 A1 * | 8/2013 | Zha | H04L 61/2582 709/245 |

(Continued)

FOREIGN PATENT DOCUMENTS

| | | |
|---|---|---|
| JP | 2007-074383 | 3/2007 |
| JP | 2008-252427 | 10/2008 |

(Continued)

OTHER PUBLICATIONS

JPOA—Office Action of Japanese Patent Application No. 2015-182298 dated Jun. 11, 2019, with full English translation of the Office Action.

*Primary Examiner* — Gary S Gracia

(74) *Attorney, Agent, or Firm* — Fujitsu Patent Center

(57) ABSTRACT

A disclosed network monitoring method includes: specifying a feature value for each of plural packet groups that were transferred between a first terminal and a second terminal on a connection between the first terminal and the second terminal; calculating a value representing variation in specified feature values; and determining whether the calculated value is equal to or greater than a predetermined threshold value.

12 Claims, 16 Drawing Sheets

(56) References Cited

U.S. PATENT DOCUMENTS

| | | | |
|---|---|---|---|
| 2014/0075536 A1* | 3/2014 | Davis | H04L 63/1416 726/13 |
| 2014/0211614 A1* | 7/2014 | Winn | H04L 41/0668 370/225 |
| 2015/0013005 A1 | 1/2015 | Yamada et al. | |
| 2015/0033322 A1* | 1/2015 | Wang | H04L 63/1425 726/13 |
| 2015/0163197 A1* | 6/2015 | Pratapa | H04L 61/255 709/245 |
| 2015/0195294 A1 | 7/2015 | Yamada et al. | |
| 2016/0191552 A1 | 6/2016 | Yamada et al. | |

FOREIGN PATENT DOCUMENTS

| | | |
|---|---|---|
| JP | 2012-015684 | 1/2012 |
| JP | 2015-015581 | 1/2015 |
| JP | 2015-133547 | 7/2015 |
| JP | 2016-127391 | 7/2016 |

* cited by examiner

| CONNECTION NUMBER | CONNECTION SOURCE | | CONNECTION DESTINATION | | TIME CONNECTION PACKET WAS OBTAINED | TIME LATEST PACKET WAS OBTAINED | PACKET GROUP INFORMATION |
|---|---|---|---|---|---|---|---|
| | IP ADDRESS | PORT NUMBER | IP ADDRESS | PORT NUMBER | | | |
| 1 | 192.168.0.1 | 50000 | 10.0.0.1 | 80 | 2015/01/01 00:00:00.000 | 2015/01/01 10:00:00.000 | ... |
| 2 | 192.168.1.11 | 50001 | 10.0.0.1 | 80 | 2015/01/01 09:59:00.000 | 2015/01/01 09:59:30.000 | ... |
| 3 | 192.168.2.2 | 50002 | 10.0.4.4 | 443 | 2015/01/01 05:00:00.000 | 2015/01/01 06:00:00.000 | ... |
| 4 | 192.168.3.3 | 50003 | 10.0.5.5 | 8080 | 2015/01/01 02:00:00.000 | 2015/01/01 03:00:00.000 | ... |
| ... | ... | ... | ... | ... | ... | ... | ... |

FIG.8

| PACKET GROUP ID | TRIGGER PACKETS ||| TRIGGER RELATION PACKETS 1 ||| TRIGGER RELATION PACKETS 2 |||
|---|---|---|---|---|---|---|---|---|---|
| | TIME PACKET WAS OBTAINED | SIZE | DATA | TIME PACKET WAS OBTAINED | SIZE | DATA | TIME PACKET WAS OBTAINED | SIZE | DATA |
| 1 | 2015/01/01 00:10:00.000 | 500 | 01234567... | 2015/01/01 00:10:00.100 | 1000 | abcdefgh... | 2015/01/01 00:10:00.200 | 800 | 4567890a... |
| 2 | 2015/01/01 00:10:23.000 | 1200 | efghijklmn... | 2015/01/01 00:10:23.100 | 600 | 654321lkj... | | | |
| 3 | 2015/01/01 00:11:10.000 | 650 | iuuytrewq... | 2015/01/01 00:11:10.200 | 1500 | asdfghjklz... | 2015/01/01 00:11:10.250 | 500 | zxcvbnma... |
| 4 | 2015/01/01 00:15:00.000 | 240 | 987kjhmn... | 2015/01/01 00:15:00.100 | 500 | fghjerty... | | | |
| ... | ... | ... | ... | ... | ... | ... | ... | ... | ... |

FIG.9

METHOD AND APPARATUS FOR MONITORING NETWORK

CROSS-REFERENCE TO RELATED APPLICATIONS

This application is based upon and claims the benefit of priority of the prior Japanese Patent Application No. 2015-182298, filed on Sep. 15, 2015, the entire contents of which are incorporated herein by reference.

FIELD

This invention relates to a technique for monitoring a network.

BACKGROUND

Attacks using malware that is uniquely developed or customized are frequently performed. Particularly, targeted attacks that steal information from a specific organization or individual by using a RAT (Remote Administration Tool), which is a remotely controlled malware, are increasing.

FIG. 1 illustrates an example of a targeted attack using a RAT. In the example in FIG. 1, an attacker that is connected to an external network such as the Internet transmits a packet A as an instruction to a terminal (this terminal is a springboard) that is connected to an internal network, which is a network of an organization. The springboard transmits a packet B that includes a RAT program or the like to another terminal that is connected to the internal network (this terminal is the target), and causes that program to be executed. The target establishes a new connection with the attacker, and transmits a packet C that includes information in the target to the attacker. Alternatively, the target is used as a new springboard for spreading the RAT.

The signature method is known as a technique for detecting malware. The signature method is a technique in which patterns of communication data are defined for each kind of malware, and malware is detected by comparing communication data that flows over a network with the patterns.

However, in the signature method, it is possible to detect only malware for which a pattern has already been created, and it is not possible to detect malware that has been uniquely developed or customized.

Moreover, there is a conventional technique for detecting communication that is related to a targeted attack. In this conventional technique, a targeted attack is detected by analyzing packets that are transferred between terminals that are connected to an internal network, and packets that are transferred between a terminal that is connected to an internal network and a terminal that is connected to an external network.

However, the conventional technique described above is based on a premise that apparatuses for capturing are located in positions so as to be capable of capturing packets that are transferred between terminals that are connected to an internal network. The number of required apparatuses for capturing increases according to the scale of the internal network. Moreover, a corresponding cost of implementing the apparatuses for capturing to a scale of an internal network has not been sufficiently studied.

Patent Document 1: Japanese Laid-open Patent Publication No. 2015-15581

Patent Document 2: Japanese Laid-open Patent Publication No. 2015-133547

SUMMARY

In other words, there is no technique to detect communication related to a targeted attack with high precision by using packets that are transferred between an external terminal and an internal terminal.

A network monitoring apparatus related to this invention includes: a memory; and a processor configured to use the memory and execute a process. And the process includes: specifying a feature value for each of plural packet groups that were transferred between a first terminal and a second terminal on a connection between the first terminal and the second terminal; calculating a value representing variation in specified feature values; and determining whether the calculated value is equal to or greater than a predetermined threshold value.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 8 is a diagram depicting an example of data stored in a connection data storage unit;

FIG. 9 is a diagram depicting an example of information of a packet group;

DESCRIPTION OF EMBODIMENTS

[Outline of Embodiments]

A connection of RAT communication has characteristics such as described below. Therefore, by determining whether a connection has the following characteristics, it is possible to narrow down candidates of a connection of RAT communication.

(1) Establishment of a connection is begun by a packet from a terminal that is connected to an internal network (here, this terminal is called an internal terminal) to a terminal that is connected to an external network (here, this terminal is called an external terminal). In other words, the connection source is an internal terminal, and the connection destination is an external terminal.

(2) A port number of the connection destination matches a HTTP (Hypertext Transfer Protocol) port number or a HTTPS (Hypertext Transfer Protocol Secure) port number.

(3) An amount of time the connection has continued is a predefined amount of time or greater.

(4) After a predefined amount of time or more has elapsed since the last packet of a group of packets (hereafter, referred to as a packet group) that includes an instruction packet that is transferred to an internal terminal and a response packet that is transferred to an external terminal has been transferred, a new instruction packet is transferred from the external terminal to the internal terminal.

However, not only a connection of RAT communication, but also a connection of a push notification has characteristics such as described above. Therefore, even though connection candidates are narrowed down based only on such characteristics, it is not possible to distinguish between a connection of a RAT communication and a connection of a push notification.

Figure 2:
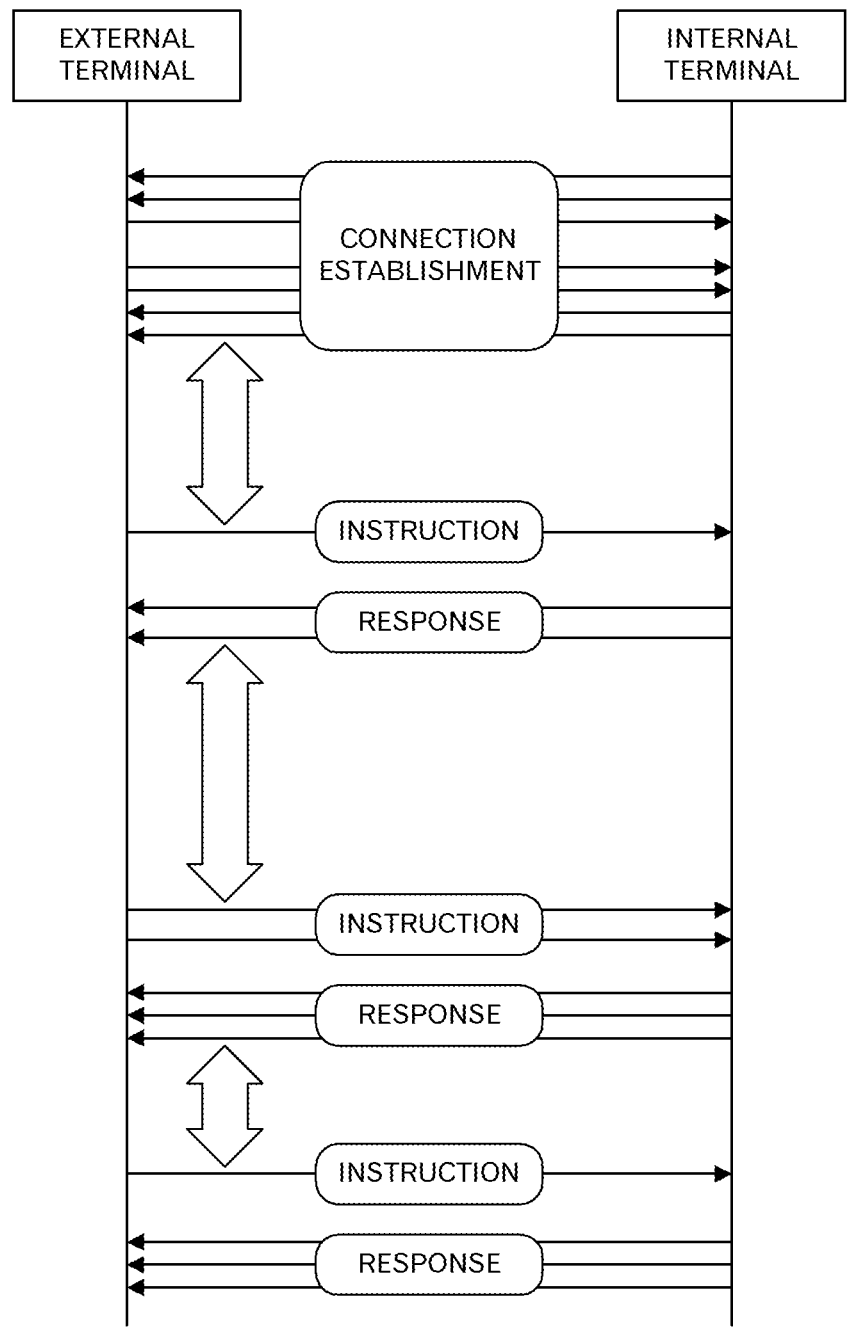
FIG. 2 is a diagram depicting a connection of RAT communication.
Figure 3:
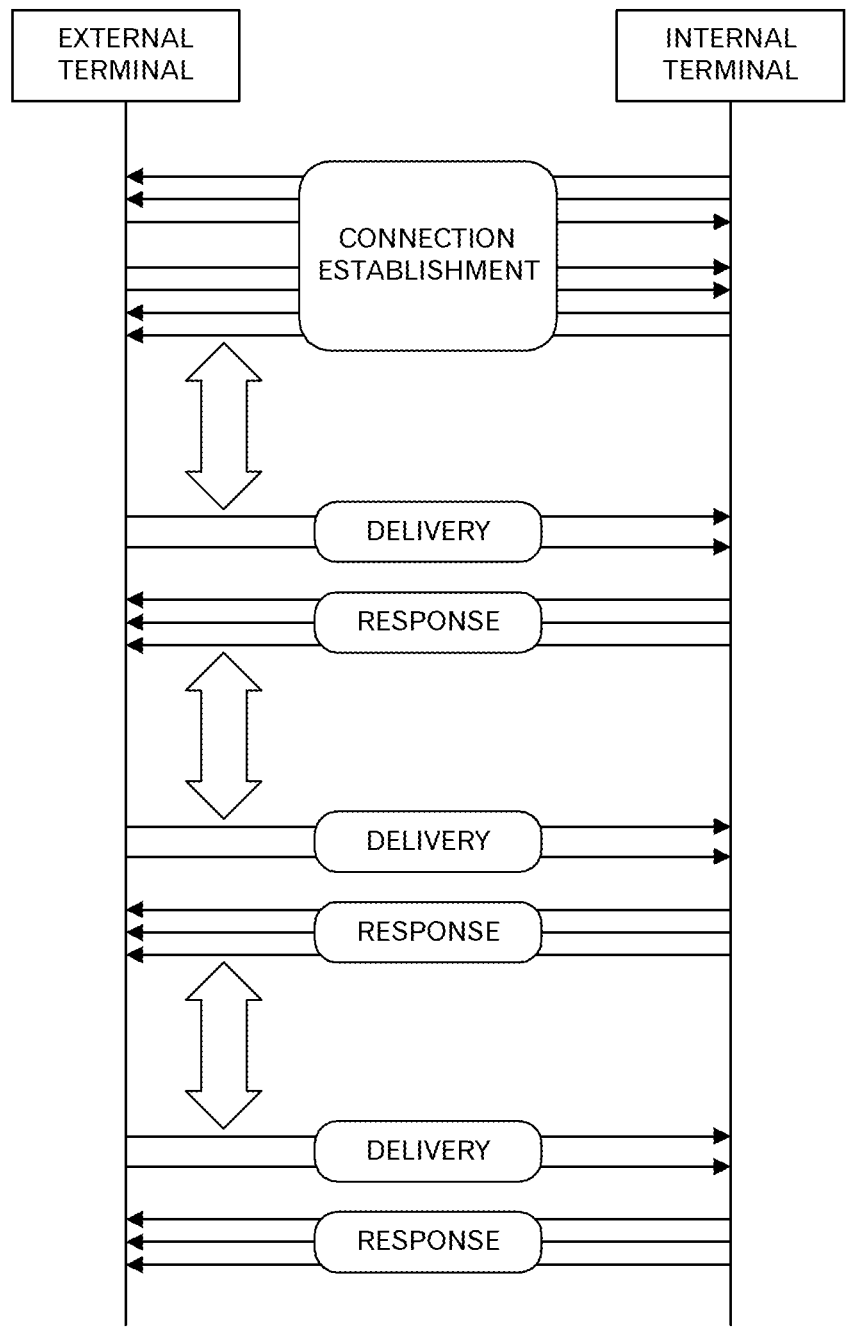
FIG. 3 is a diagram depicting a connection of a push notification.

A connection of RAT communication and a connection of a push notification will be explained using FIG. 2 and FIG. 3. FIG. 2 is a diagram depicting a connection of RAT communication. FIG. 3 is a diagram depicting a connection of a push notification. In FIG. 2 and FIG. 3, thin solid arrows represent transfer of packets. Differences in the positions in the vertical direction represent differences in transfer times, and packets with earlier transfer times are illustrated at higher positions.

As illustrated in FIG. 3, because a service is started in response to a request from an internal terminal to an external terminal, a push notification has a characteristic that establishment of a connection is started by a packet from the internal terminal to the external terminal. Moreover, also in a push notification, normally a port number of a connection destination is the same as an HTTP port number or HTTPS port number and a duration time of a connection is long since delivery is repeated. Furthermore, a push notification has a characteristic that a packet is transferred from an external terminal to an internal terminal when a predefined amount of time has elapsed after delivery at a certain time has ended. In this point, a push notification is the same as RAT communication.

However, as can be seen in FIG. 2 and FIG. 3, the following points differ between RAT communication and a push notification.

(5) In RAT communication, an attacker creates contents of an instruction and inputs that instruction manually, and thus there is variation in time intervals between packet groups. On the other hand, push notifications are often delivered regularly, and the time intervals between packet groups are fixed.

(6) In RAT communication, contents of an instruction changes for each instruction, and thus the number of packets greatly differs among packet groups. On the other hand, in a push notification, often a delivery format is the same such as in the case of delivering stock price information, and thus the number of packets is fixed.

Moreover, RAT communication and a push notification are also different in the following points.

(7) In RAT communication, the attacker inputs a different instruction at each time, and thus contents included in data parts of packets differ greatly among packet groups. On the other hand, in a push notification, often a delivery format is always the same and contents differ only a little such as in the case of delivering stock price information, and thus a difference in contents included in data parts among packet groups is small compared with RAT communication.

(8) For the same reason, packet sizes greatly differ among packet groups in RAT communication, however, the difference in packet sizes among packet groups in push notification is small compared with RAT communication.

Therefore, by further using the characteristics (5) to (8) described above, it is possible to distinguish between a connection of RAT communication and a connection of a push notification. In the following, a method for detecting RAT communication using the characteristics (1) to (8) described above will be explained.

[Embodiment 1]

Figure 1:
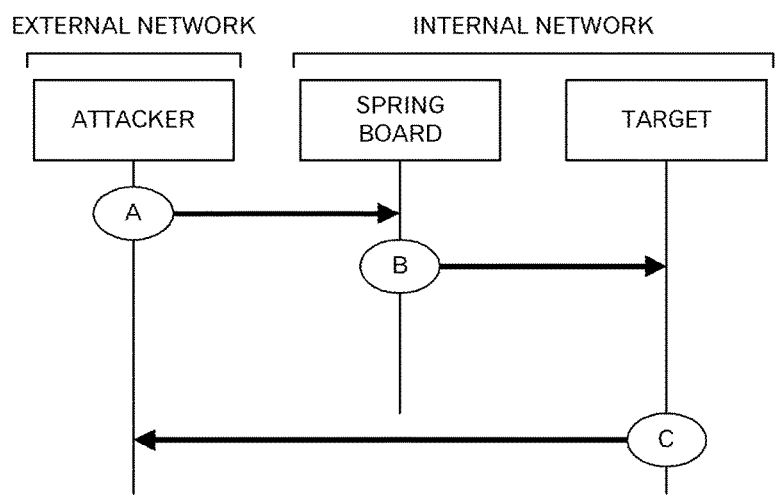
FIG. 1 is a diagram depicting an example of a targeted attack using RAT.
Figure 4:
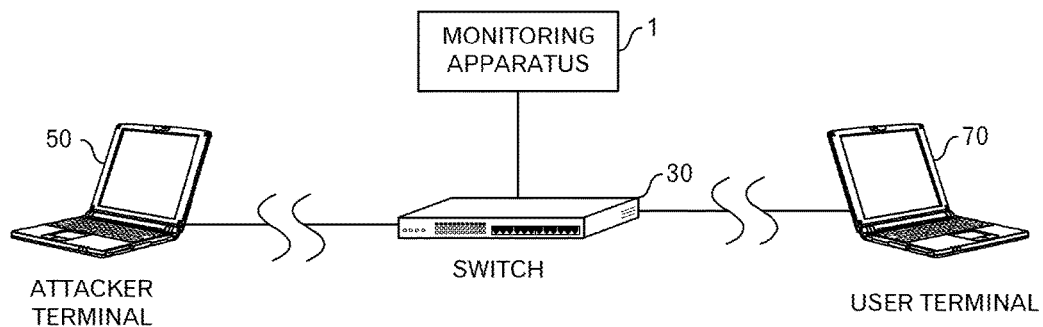
FIG. 4 is a diagram depicting an outline of a system in this embodiment.

FIG. 4 illustrates an outline of a system of this embodiment. A switch 30 is a network switch and relays a packet that is transferred between an attacker terminal 50 that sends an RAT to an internal network and a user terminal 70 that is connected to the internal network and is a target of an RAT attack. A monitoring apparatus 1 that executes the main processing of this embodiment is connected to the switch 30. The monitoring apparatus 1 obtains a copy of the packet that the switch 30 relays and detects a connection for communication related to an RAT attack (hereafter, referred to as RAT communication) based on that obtained packet.

Figure 5:
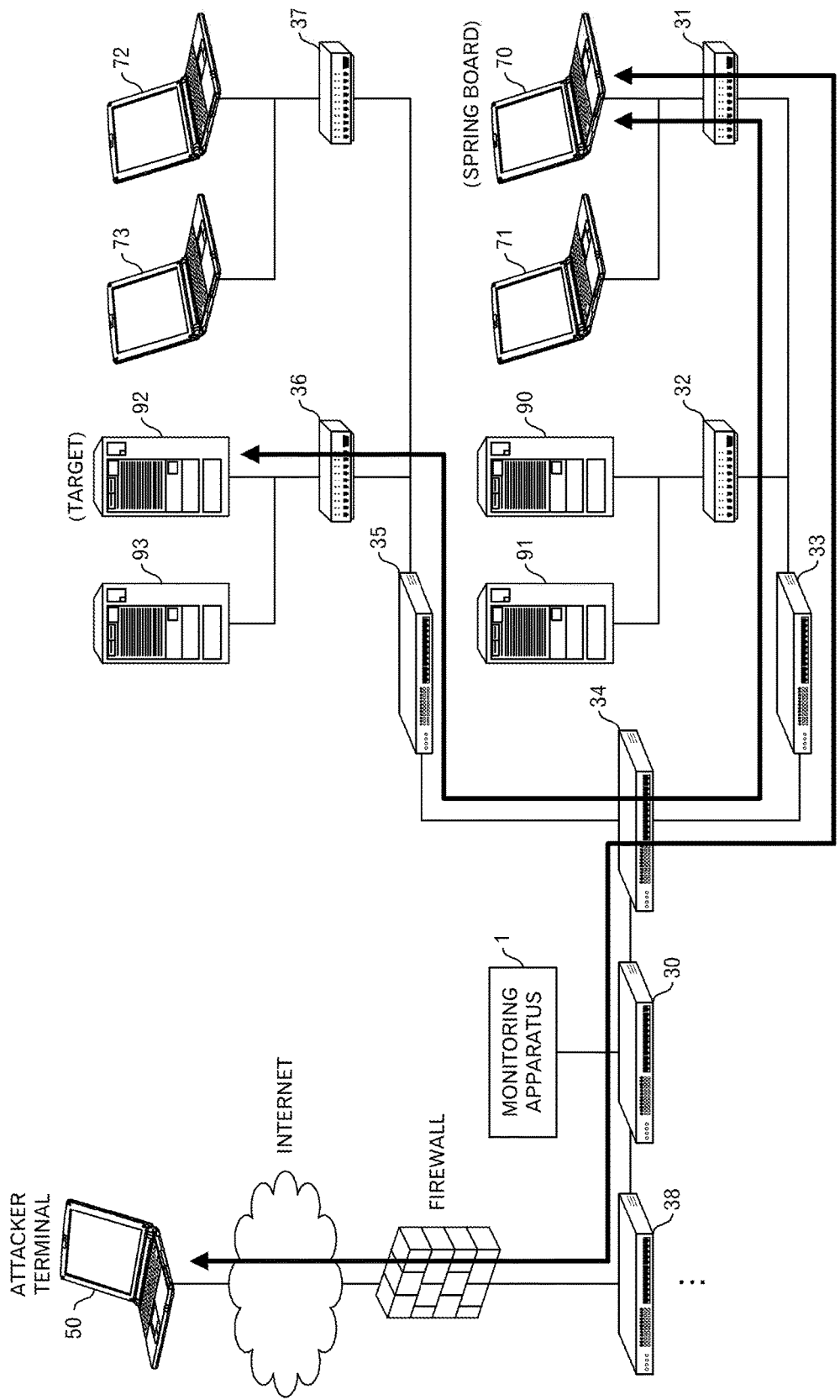
FIG. 5 is a diagram for explaining relative positions of a monitoring apparatus, a switch, an attacker terminal and a user terminal.

The relative positions of the monitoring apparatus 1, switch 30, attacker terminal 50, and user terminal 70 will be explained in more detail using FIG. 5. In FIG. 5, user terminals 70 to 73 and servers 90 to 93 are connected to an internal network in which relay apparatuses 31 to 38 such as switches and routers are deployed. Here, the user terminal 70 is a springboard, and the server 92 is a target. RAT communication occurs between the attacker terminal 50 and user terminal 70, and between the user terminal 70 and the server 92. A switch 30 is deployed between the relay apparatus 34 and the relay apparatus 38, and is able to capture packets between the attacker terminal 50 and the user terminal 70. In this way, the switch 30 may not be deployed in a position capable of capturing packets that are transferred between apparatuses that are connected to the internal network (for example, between the user terminal 70 and the server 92).

The detailed form of the system of this embodiment is not limited to a form such as illustrated in FIG. 5. Moreover, the numbers of user terminals, servers and relay apparatuses are not limited.

Figure 6:
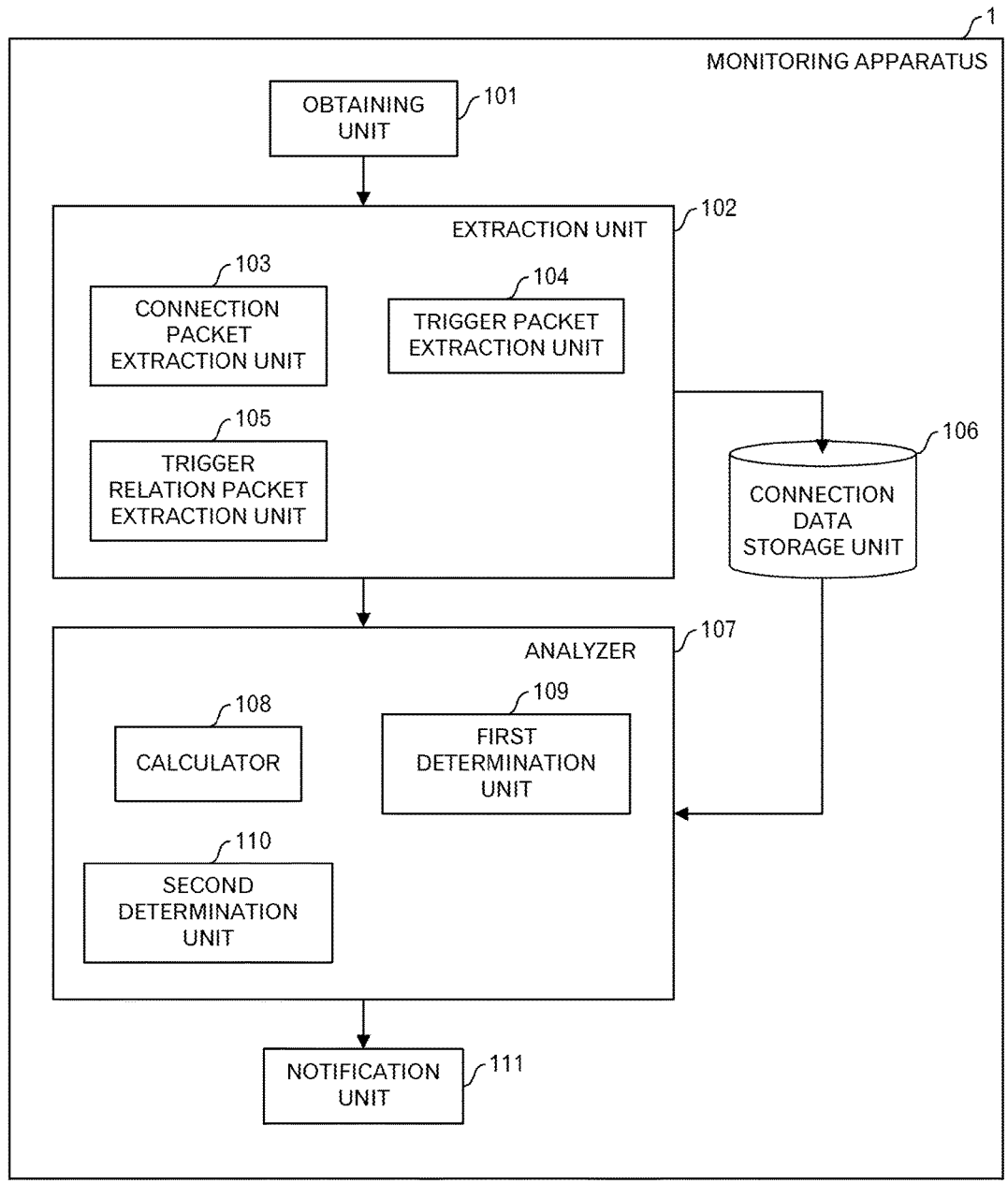
FIG. 6 is a functional block diagram of the monitoring apparatus in a first embodiment.

FIG. 6 illustrates a functional block diagram of the monitoring apparatus 1 of the first embodiment. The monitoring apparatus 1 includes an obtaining unit 101, an extraction unit 102, a connection data storage unit 106, an analyzer 107 and a notification unit 111. The extraction unit 102 includes a connection packet extraction unit 103, a trigger packet extraction unit 104, and a trigger relation packet extraction unit 105. The analyzer 107 includes a calculator 108, a first determination unit 109 and a second determination unit 110.

The obtaining unit 101 obtains packets (actually copies) that are relayed by the switch 30, and outputs them to the extraction unit 102. The connection packet extraction unit 103 in the extraction unit 102 detects the first packet (hereafter, referred to as the connection packet) of the packets for establishing a new connection, and stores information related to the connection packet in the connection data storage unit 106. The trigger packet extraction unit 104 detects a trigger packet which will be explained later, and stores information related to the trigger packet in the connection data storage unit 106. The trigger relation packet extraction unit 105 extracts trigger relation packets that will be explained later, and stores information related to the trigger relation packets in the connection data storage unit 106. The calculator 108 in the analyzer 107 calculates, based on data that is stored in the connection data storage unit 106, a value that represents variation in feature values among packet groups that will be explained later (the value is a standard deviation in this embodiment). The first determination unit 109 executes, based on the value calculated by the calculator 108, processing for determining whether a target connection is an RAT communication connection. The second determination unit 110, based on data that is stored in the connection data storage unit 106, executes processing for determining whether the target connection is an RAT communication connection. The notification unit 111 executes, based on the results of the processing by the analyzer 107, processing for transmitting information related to a connection of RAT communication to an administrator terminal in an internal network of an organization, for example.

Next, processing that is executed by the monitoring apparatus 1 in the first embodiment will be explained using FIG. 7 to FIG. 12.

First, the obtaining unit 101 of the monitoring apparatus 1 obtains a copy of a packet (hereafter, this will be referred to as a target packet) that is relayed by the switch 30 from the switch 30 (FIG. 7: step S1), and outputs that packet to the extraction unit 102.

The extraction unit 102 reads out data that is to be used for analysis from the target packet (step S3). The data that is to be used for analysis is, for example, a time when a packet was obtained, an IP (Internet Protocol) address of a transmission source, an IP address of a transmission destination, a protocol, a TCP (Transmission Control Protocol) port number, TCP flags (for example, SYN (SYNchronize) flag and ACK (ACKnowledge) flag), a packet size, a data part of the packet, and the like.

The connection packet extraction unit 103 in the extraction unit 102 determines, based on the data that was read out in step S3, whether the target packet is a connection packet (step S5). As was described above, a connection packet is the first packet of packets for establishing a new connection. For example, when the SYN flag is 1 and the ACK flag is 1, the target packet is determined to be a connection packet.

When the target packet is not a connection packet (step S5: NO route), processing shifts to step S13 in FIG. 10 by way of terminal A. On the other hand, when the target packet is a connection packet (step S5: YES route), the connection packet extraction unit 103 stores the IP address of the connection source (here, this is the IP address of the transmission source), the IP address of the connection destination (here, this is the IP address of the transmission destination), the port number of the connection source and the port number of the connection destination, and the time when the target packet was obtained in the connection data storage unit 106 for the connection to be newly established (step S7).

FIG. 8 illustrates an example of data that is stored in the connection data storage unit 106. In the example in FIG. 8, a connection number that is a number assigned to an established connection, an IP address and port number of a connection source, an IP address and port number of a connection destination, a time when a connection packet was obtained, a time when a latest packet was obtained on the connection, and information of a packet group are stored. At the time that step S7 is executed, the target packet is the latest packet, and thus the time when the target packet was obtained is also stored in the column for the time when the latest packet was obtained.

The information of a packet group includes information such as illustrated in FIG. 9, for example. In the example in FIG. 9, a packet group ID (IDentifier) which is identification information for identifying a packet group, a time when a packet was obtained, a packet size, and a data part of a trigger packet, a time when a packet was obtained, a packet size, and a data part of each trigger relation packet are stored. The trigger packet and the trigger relation packet will be explained later.

Figure 7:
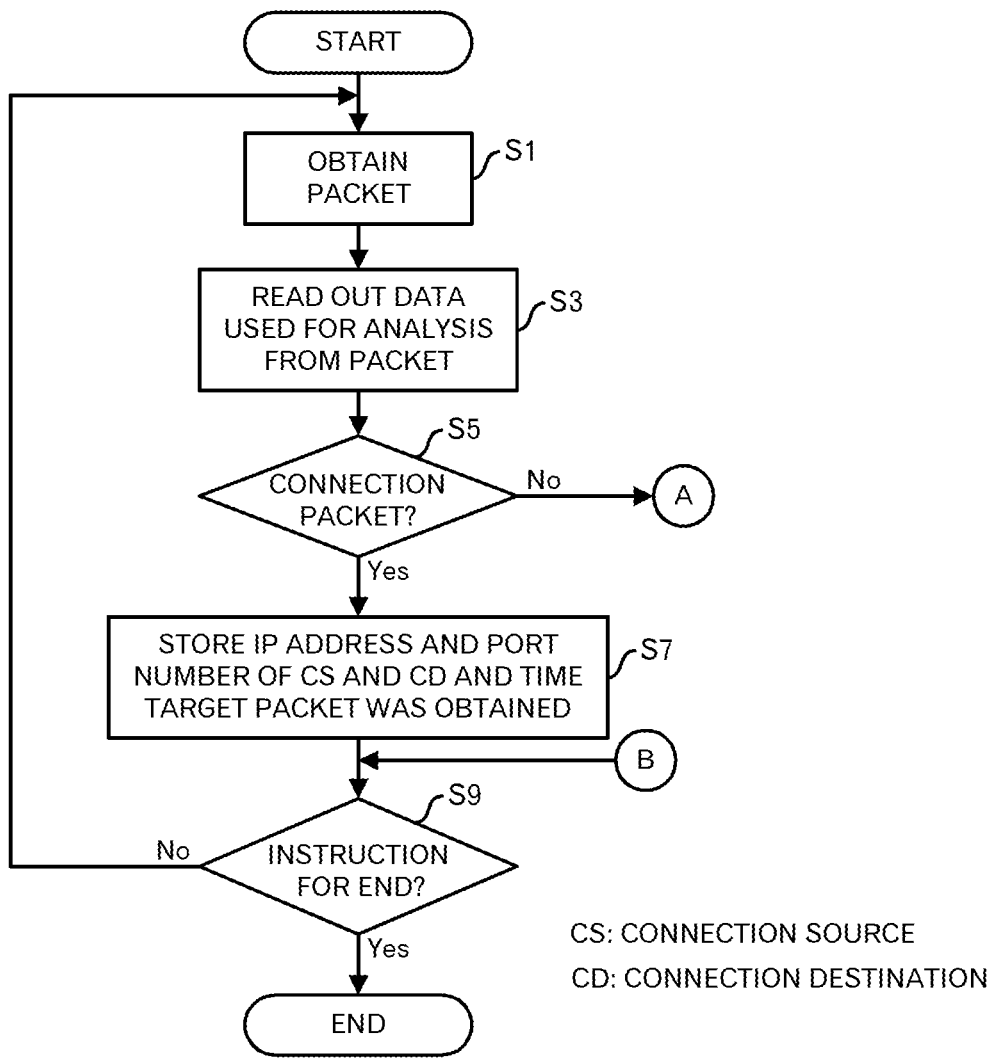
FIG. 7 is a diagram depicting a processing flow of processing executed by the monitoring apparatus in the first embodiment.

Returning to the explanation of FIG. 7, the extraction unit 102 determines whether an end instruction has been accepted from a system administrator (step S9). When the end instruction has not been accepted (step S9: NO route), the processing returns to step S1. On the other hand, when the end instruction has been accepted (step S9: YES route), the processing ends.

The processing after the terminal A will be explained using FIG. 10. The trigger packet extraction unit 104 in the extraction unit 102 determines whether a connection having the same IP address of the transmission source, the same IP address of the transmission destination, the same port number of the transmission source and the same port number of the transmission destination as the target packet (or in other words, a connection that is the same as the connection of the target packet) is registered in the connection data storage unit 106 (step S13).

When a connection that is the same as the connection of the target packet is not registered in the connection data storage unit 106 (step S13: NO route), the processing returns to step S9 in FIG. 7 by way of terminal B.

However, when a connection that is the same as the connection for the target packet is registered in the connection data storage unit 106 (step S13: YES route), the trigger packet extraction unit 104, based on the IP address of the transmission source and the IP address of the transmission destination of the target packet, determines whether the target packet has been transmitted from the connection destination to the connection source (step S15). For example, when the IP address of the transmission source is the same as the IP address of the connection destination that is stored in the connection data storage unit 106, and the IP address of the transmission destination is the same as the IP address of the connection source that is stored in the connection data storage unit 106, the target packet is determined to have been transmitted from the connection destination to the connection source.

When the target packet was not transmitted from the connection destination to the connection source (step S15: NO route), the processing shifts to step S23. On the other hand, when the target packet was transmitted from the connection destination to the connection source (step S15: Yes route), the trigger packet extraction unit 104 determine whether a difference between the time when the target packet was obtained and the time when the last packet on the same connection was obtained is equal to or longer than a first predetermined amount of time (for example, 10 seconds) (step S17).

When the difference is equal to or greater than the first predetermined amount of time (step S17: YES route), the target packet is a trigger packet. Therefore, the trigger packet extraction unit 104 generates a new packet group ID (step S19). In step S19, for example, a new packet group ID is generated by adding 1 to the previously generated packet group ID.

Figure 11:
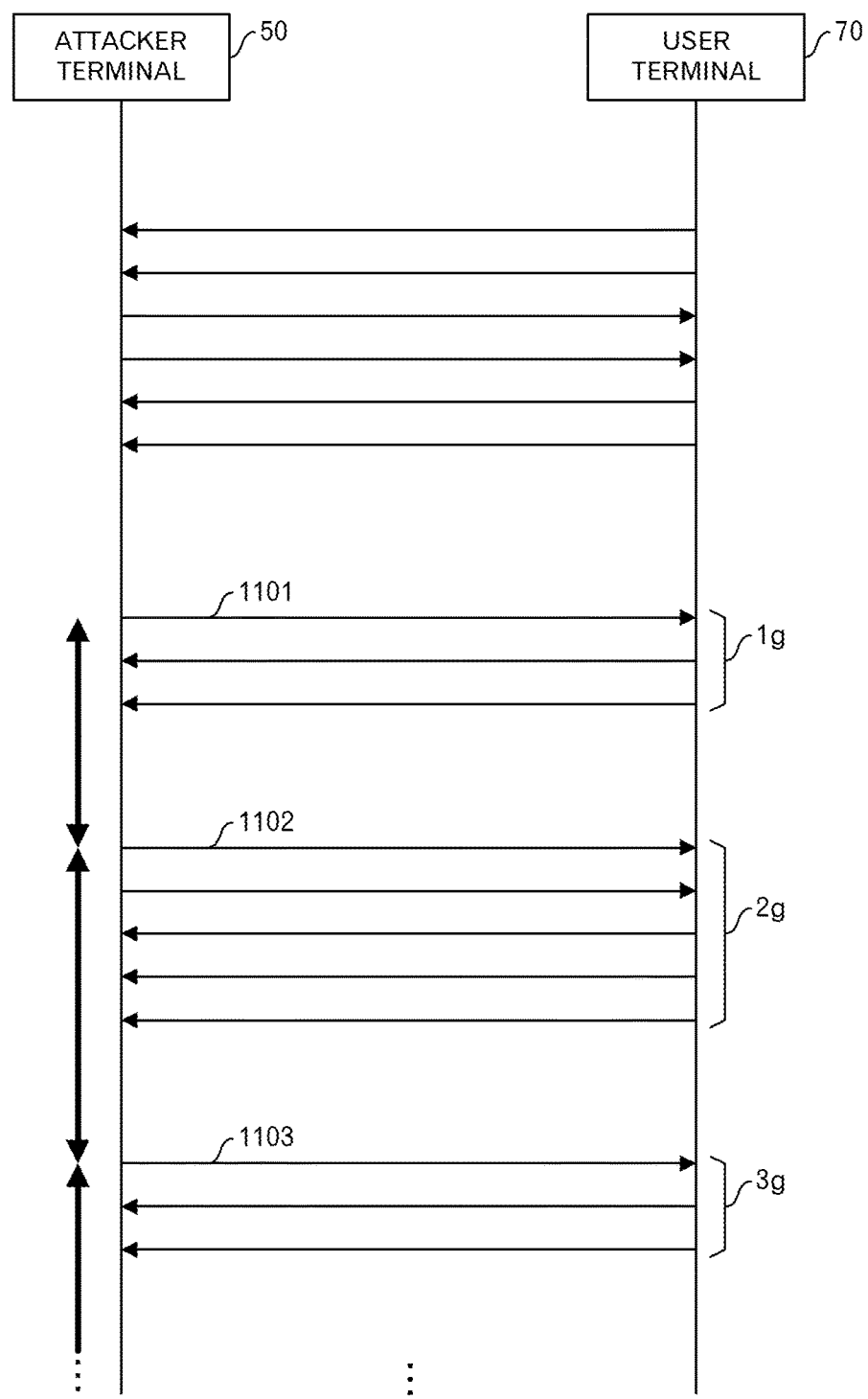
FIG. 11 is a diagram for explaining a trigger packet and a trigger relation packet.

Trigger packets and trigger relation packets will be explained using FIG. 11. In FIG. 11, thin solid arrows represent transfer of packets. The differences in the positions in the vertical direction represent differences in transfer times, and packets with earlier transfer times are illustrated at higher positions.

In FIG. 11, the trigger packets are packet 1101 that is transferred first of the packets in packet group 1g, packet 1102 that is transferred first of the packets in packet group 2g, and packet 1103 that is transferred first of the packets in packet group 3g. The trigger relation packets are the packets included in packet group 1g other than packet 1101, the packets included in packet group 2g other than packet 1102, and the packets included in packet group 3g other than packet 1103. In this embodiment, the time interval between trigger packets is taken to be the time interval between packet groups. As was explained for characteristic (5), in RAT communication, there is variation in time intervals between packet groups.

Figure 10:
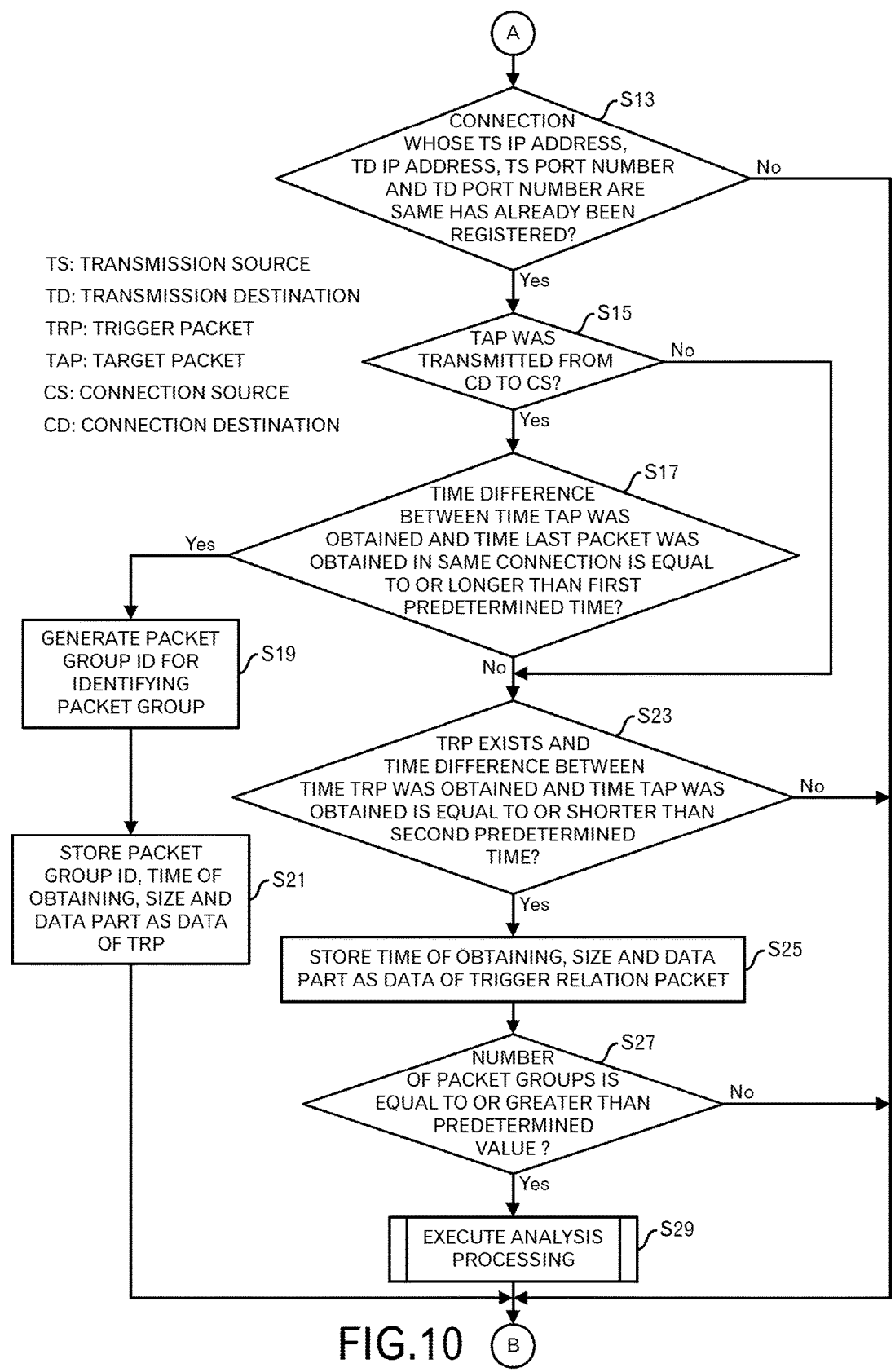
FIG. 10 is a diagram depicting a processing flow of processing executed by the monitoring apparatus in the first embodiment.

Returning to the explanation of FIG. 10, the trigger packet extraction unit 104 stores the packet group ID that was generated in step S19, the time that the trigger packet was obtained, a size of the trigger packet, and the data part of the trigger packet as trigger packet data in the connection data storage unit 106 (step S21). Processing then returns to the processing of step S9 in FIG. 7 by way of the terminal B.

On the other hand, when the difference is not equal to or longer than the first predetermined amount of time (step S17: NO route), the trigger relation packet extraction unit 105 executes the processing below. Specifically, the trigger relation packet extraction unit 105 determines whether data of the trigger packets in the same connection as the target packet is in the connection data storage unit 106 and the difference between the time when the trigger packet was obtained and the time when the target packet was obtained is equal to or shorter than a second predetermined amount of time (for example, 1 second) (step S23).

When the data of the trigger packet in the same connection as the target packet is not stored in the connection data storage unit 106, or when the difference between the time when the trigger packet was obtained and the time when the target packet was obtained is not equal to or shorter than the second predetermine amount of time (step S23: NO route), the processing returns to step S9 in FIG. 7 by way of the terminal B. On the other hand, when the data of the trigger packet in the same connection as the target packet is in the connection data storage unit 106 and the difference between the time when the trigger packet was obtained and the time when the target packet was obtained is equal to or shorter than the second predetermined amount of time (step S23: YES route), the target packet is a trigger relation packet. Therefore, the trigger relation packet extraction unit 105 stores the time the trigger relation packet was obtained, a size of the trigger relation packet, and the data part of the trigger relation packet as data of trigger relation packet in the connection data storage unit 106 (step S25). The trigger relation packet extraction unit 105 notifies the analyzer 107 that a trigger relation packet was extracted.

The analyzer 107 determines whether the number of packet groups in the connection of the target packet is equal to or greater than a predetermined value (for example, 4) (step S27). When the number of packet groups in the connection of the target packet is not equal to or greater than the predetermined value (step S27: NO route), the processing returns to step S9 in FIG. 7 by way of the terminal B. On the other hand, when the number of packet groups in the connection of the target packet is equal to or greater than the predetermined value (step S27: YES route), the analyzer 107 executes an analysis process (step S29). The analysis processing will be explained using FIG. 12. The last packet group is removed from a target of the analysis processing.

Figure 12:
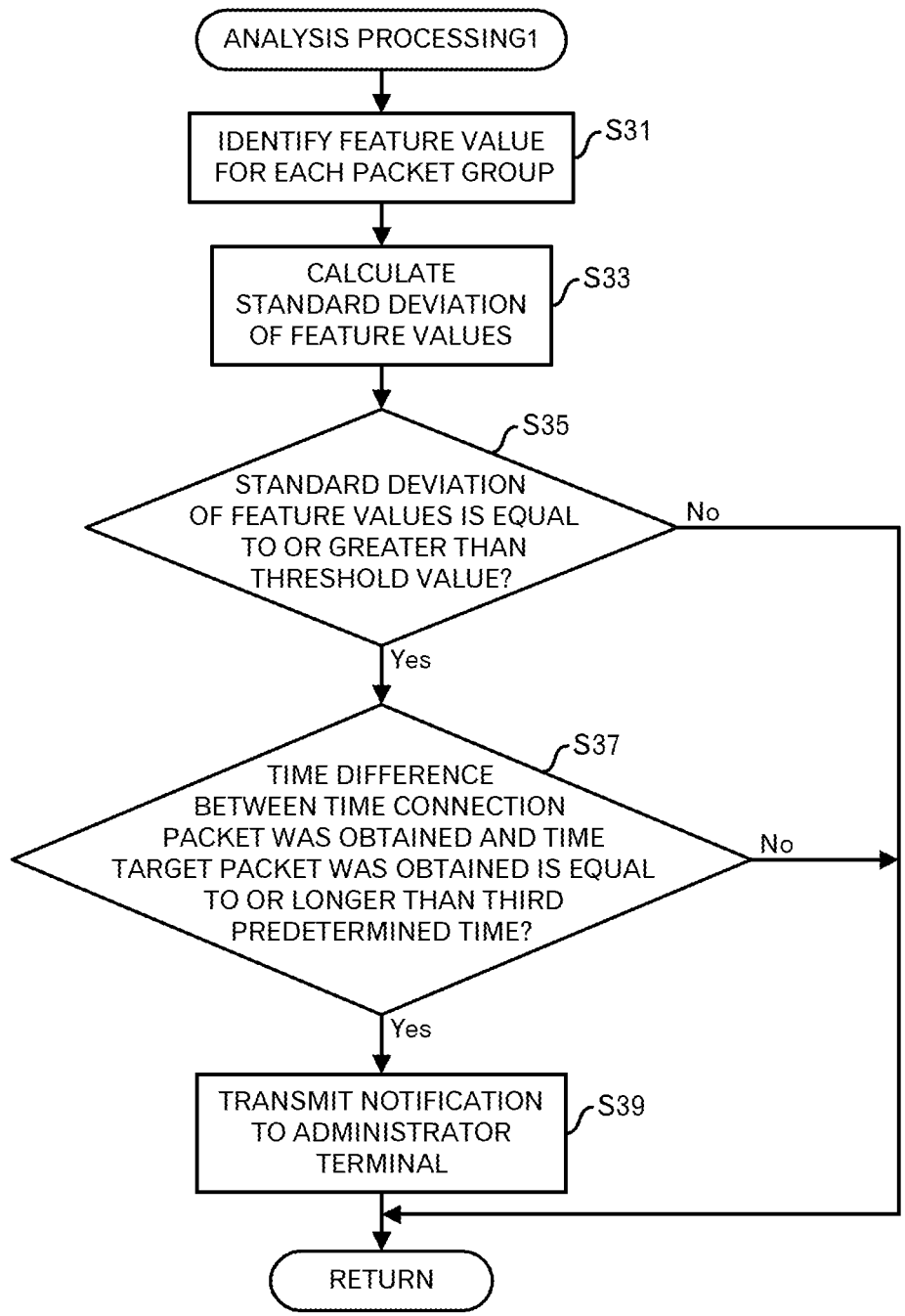
FIG. 12 is a diagram depicting a processing flow of analysis processing.

First, the calculator 108 in the analyzer 107 identifies a feature value for each packet group from the packet group information that is stored in the connection data storage unit 106 (FIG. 12: step S31). The feature value is a value that is related to, for example, a time interval between a packet group and the previous packet group or the following packet group, the number of packets, contents of the data part of a packet, or a packet size. A value related to the contents of the data part is, for example, a value that is calculated by a function when the data part is inputted. For example, a size of a packet that is transferred in a specified turn (for example, the packet transferred first) or an average value of packet sizes is used as a value related to the packet size.

The first determination unit 109 calculates a standard deviation of the feature values from the feature values that were calculated in step S31 (step S33), and determines whether the calculated standard deviation is equal to or greater than a threshold value (step S35). The threshold value is, for example, the average value between a standard deviation that was calculated for a connection of RAT communication and a standard deviation that was calculated for a connection of a push notification. By setting a threshold value in this way, it is possible to determine whether the target connection resembles a connection of RAT communication or a connection of push notification.

When the standard deviation of the feature values is not equal to or greater than the threshold value (step S35: NO route), the processing returns to the calling source processing and returns to step S9 in FIG. 7 by way of the terminal B. However, when the standard deviation of the feature values is equal to or greater than the threshold value (step S35: YES route), the second determination unit 110 determines, based on data that is stored in the connection data storage unit 106, whether the difference between the time when the connection packet was obtained and the time when the target packet was obtained is equal to or greater than a third predetermined amount of time (for example, 10 minutes) (step S37).

When the difference between the time when the connection packet was obtained and the time when the target packet was obtained is not equal to or greater than the third predetermined amount of time (step S37: NO route), the processing returns to the calling source processing and returns to step S9 in FIG. 7 by way of the terminal B. On the other hand, when the difference between the time when the connection packet was obtained and the time when the target packet was obtained is equal to or greater than the third predetermined amount of time (step S37: YES route), the connection of the target packet is a connection of RAT communication. Therefore, the second determination unit 110 outputs information related to the connection of the target packet (for example, the IP address of the transmission destination and the IP address of the transmission source) to the notification unit 111. Accordingly, the notification unit 111 transmits a notification that includes the information related to the connection of the target packet to the terminal of the system administrator (step S39). The processing then returns to the calling source processing and then returns to the processing of the step S9 in FIG. 7 by way of the terminal B.

As described above, by using the characteristic that the variation in feature values of connections of RAT communication is larger than that of connections of a push notification, it is possible to detect RAT communication with high precision. Moreover, with the method of this embodiment, even in the case that a target of an attack is an individual or in a stage before a springboard in an organization attempts to invade the next target, it is possible to detect RAT communication.

[Embodiment 2]

In the second embodiment, it becomes possible to detect RAT communication with even higher precision by further narrowing down the candidates of a connection of RAT communication.

Figure 13:
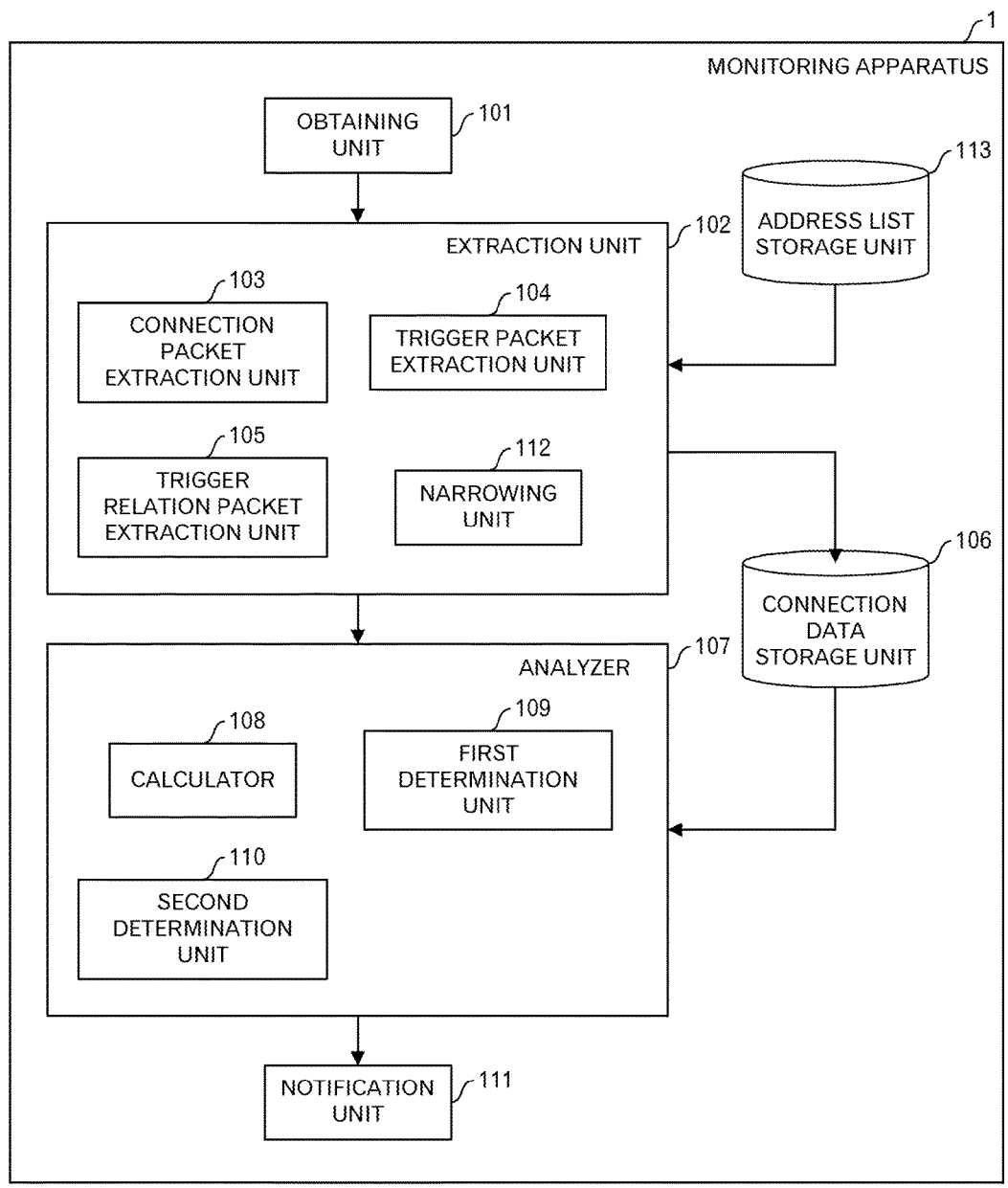
FIG. 13 is a functional block diagram of the monitoring apparatus in a second embodiment.

FIG. 13 illustrates a functional block diagram of the monitoring apparatus 1 of the second embodiment. The monitoring apparatus 1 of the second embodiment includes an obtaining unit 101, an extraction unit 102, a connection data storage unit 106, an analyzer 107, a notification unit 111, and an address list storage unit 113. The extraction unit 102 includes a connection packet extraction unit 103, a trigger packet extraction unit 104, a trigger relation packet extraction unit 105, and a narrowing unit 112. The analyzer 107 includes a calculator 108, a first determination unit 109 and a second determination unit 110.

The obtaining unit 101 obtains packets (actually copies) that are relayed by the switch 30, and outputs those packets to the extraction unit 102. The narrowing unit 112 in the extraction unit 102 detects a connection packet based on data that is stored in the address list storage unit 113, and outputs the connection packet to the connection packet extraction unit 103. The connection packet extraction unit 103 stores information related to the connection packet in the connection data storage unit 106. The trigger packet extraction unit 104 detects a trigger packet and stores information related to the trigger packet in the connection data storage unit 106. The trigger relation packet extraction unit 105 extracts a trigger relation packet and stores information related to the trigger relation packet in the connection data storage unit 106. The calculator 108 in the analyzer 107 calculates, based on data that is stored in the connection data storage unit 106, a value that represents variation in feature values (in this embodiment, a standard deviation). The first determination unit 109 executes, based on the value that was calculated by the calculator 108, processing to determine whether the target connection is a connection of RAT communication. The second determination unit 110 executes, based on data that is stored in the connection data storage unit 106, processing to determine whether the target connection is a connection of RAT communication. The notification unit 111 executes, based on a results of the processing by the analyzer 107, processing for transmitting information related to a connection of RAT communication to the administrator terminal in an internal network of an organization, for example.

Figure 14:
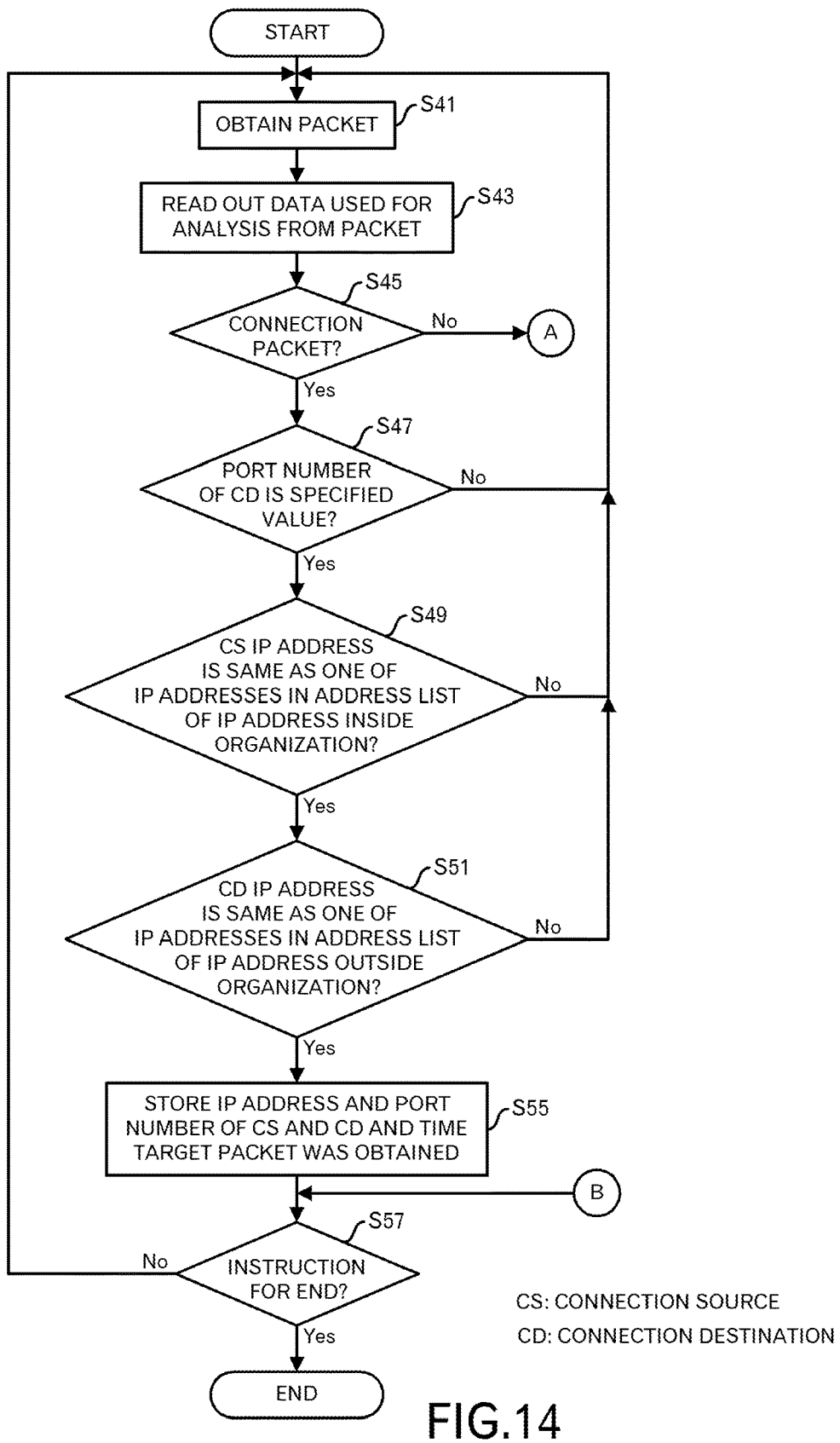
FIG. 14 is a diagram depicting a processing flow of processing executed by the monitoring apparatus in the second embodiment.

Next, FIG. 14 will be used to explain processing by the monitoring apparatus 1 of the second embodiment.

First, the obtaining unit 101 of the monitoring apparatus 1 obtains a copy of a packet that is relayed by the switch 30 (hereafter, this packet will be referred to as the target packet) from the switch 30 (FIG. 14: step S41), and outputs that target packet to the extraction unit 102.

The extraction unit 102 reads out data that is used for analysis from the target packet (step S43). The data that is used for analysis is, for example, a time when a packet was obtained, an IP address of a transmission source, an IP address of a transmission destination, a protocol, a TCP port number, TCP flags (for example, SYN flag and ACK flag), a packet size, a data part of the packet, and the like.

The narrowing unit 112 in the extraction unit 102 determines, based on the data that was read out in the step S43, whether the target packet is a connection packet (step S45). As was described above, a connection packet is the first packet of the packets for establishing a new connection. For example, when the SYN flag is 1 and the ACK flag is 1, the target packet is determined to be a connection packet.

When the target packet is not a connection packet (step S45: NO route), the processing shifts to the step S13 in FIG. 10 by way of the terminal A. On the other hand, when the target packet is a connection packet (step S45: YES route), the narrowing unit 112 determines whether the port number of the connection destination is a specified value (here, 80, 443, or 8080 which are used for HTTP or HTTPS) (step S47).

Figure 15:
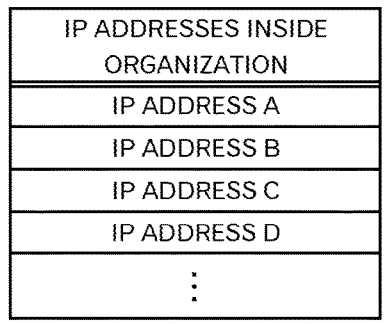
FIG. 15 is a diagram depicting an example of a list of IP addresses inside an organization, which is stored in an address list storage unit.

When the port number of the connection destination is not the specified value (step S47: NO route), the processing returns to the step S41. However, when the port number of the connection destination is the specified value (step S47: YES route), the narrowing unit 112 determines whether the IP address of the connection source matches any of the IP addresses in a list of IP addresses inside an organization, which is stored in the address list storage unit 113 (step S49). FIG. 15 illustrates an example of the list of IP addresses inside the organization, which is stored in the address list storage unit 113. In the example illustrated in FIG. 15, IP addresses of devices that are connected to the internal network are stored as IP addresses inside the organization.

Figure 16:
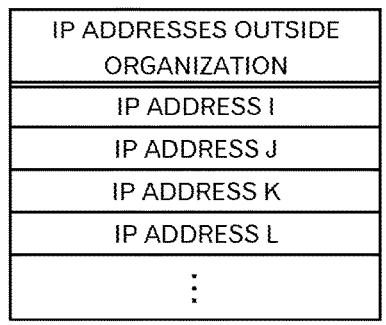
FIG. 16 is a diagram depicting an example of a list of IP addresses outside the organization, which is stored in the address list storage unit.

When the IP address of the connection source does not match any of the IP addresses in the list of IP addresses inside the organization (step S49: NO route), the processing returns to the step S41. However, when the IP address of the connection source matches an IP address in the list of IP addresses inside the organization (step S49: YES route), the narrowing unit 112 determines whether the IP address of the connection destination matches any of the IP addresses in a list of IP addresses outside the organization, which is stored in the address list storage unit 113 (step S51). FIG. 16 illustrates an example of the list of IP addresses outside the organization, which is stored in the address list storage unit 113. In the example in FIG. 16, IP addresses of devices that are connected to an external network are stored as IP addresses outside the organization.

When the IP address of the connection destination does not match any of the IP addresses in the list of IP addresses outside the organization (step S51: NO route), processing returns to the processing of step S41. However, when the IP address of the connection destination matches an IP address in the list of IP addresses outside the organization (step S51:

YES route), the narrowing unit 112 notifies the connection packet extraction unit 103 that the target packet is a connection packet.

Accordingly, the connection packet extraction unit 103 stores, in the connection data storage unit 106, the IP address of the connection source (here, this is the IP address of the transmission source), the IP address of the connection destination (here, this is the IP address of the transmission destination), the port number of the connection source and the port number of the connection destination, and the time when the target packet was obtained for the newly established connection (step S55).

The extraction unit 102 determines whether an end instruction has been accepted from the system administrator (step S57). When the end instruction has not been accepted (step S57: NO route), the processing returns to the step S41. On the other hand, when the end instruction has been accepted (step S57: YES route), the processing ends. The processing from the terminal A on is as was explained using FIG. 10, and thus an explanation here will be omitted.

By executing the processing described above, it becomes possible to detect RAT communication with even higher precision. Moreover, it is possible to reduce the number of connections for which a feature value is analyzed, and thus it becomes possible to reduce a processing load on the monitoring apparatus 1.

[Embodiment 3]

Another example of the analysis processing will be explained in the third embodiment. The outline of the system and functional blocks of the monitoring apparatus 1 are the same as was explained for the first embodiment.

Figure 17:
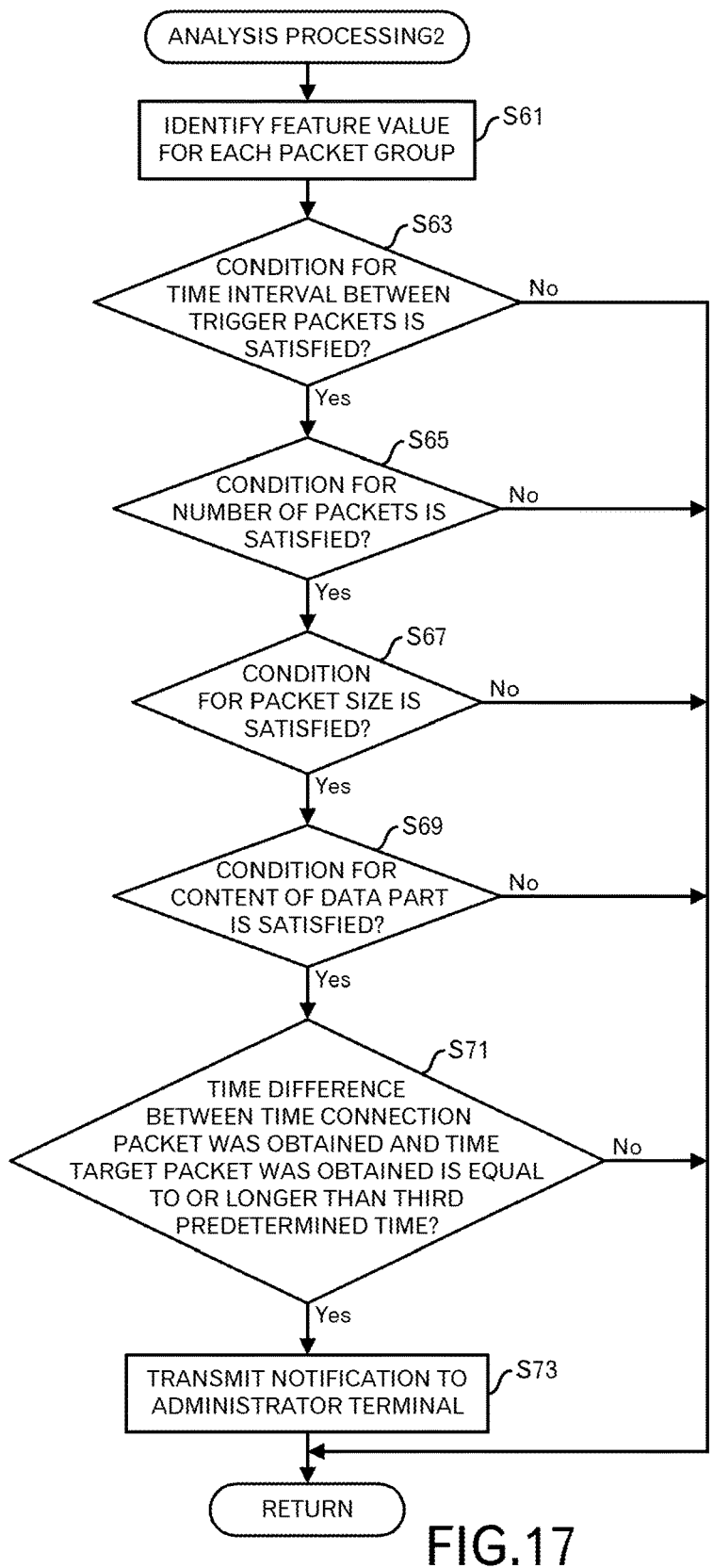
FIG. 17 is a diagram depicting a processing flow of the analysis processing in a third embodiment.

The analysis processing of the third embodiment will be explained using FIG. 17. First, the calculator 108 in the analyzer 107 identifies feature values from packet group information that is stored in the connection data storage unit 106 for each packet group (FIG. 17: step S61). The feature value is a value that is related to, for example, the time interval between a packet group and a previous or following packet group, the number of packets, contents of the data part of the packet, or the packet size.

The first determination unit 109 determines whether a condition for the time interval between trigger packets is satisfied (step S63). This condition is, for example, a condition that a standard deviation of the time intervals between trigger packets is equal to or greater than a threshold value. The threshold value is, for example, an average value between a standard deviation that is calculated for the time intervals in the case of RAT communication and a standard deviation that is calculated for the time intervals in the case of a push notification.

When the condition for the time interval between trigger packets is not satisfied (step S63: NO route), the processing returns to the calling source processing, and returns to the step S9 in FIG. 7 by way of terminal the B. On the other hand, when the condition for the time interval between trigger packets is satisfied (step S63: YES route), the first determination unit 109 determines whether a condition for the number of packets is satisfied (step S65). This condition is, for example, a condition that a standard deviation of the number of packets is equal to or greater than a threshold value. The threshold value is, for example, an average value between a standard deviation that is calculated for the number of packets in the case of RAT communication, and a standard deviation that is calculated for the number of packets in the case of a push notification.

When the condition for the number of packets is not satisfied (step S65: NO route), the processing returns to the calling source processing, and returns to the step S9 in FIG. 7 byway of the terminal B. On the other hand, when the condition for the number of packets is satisfied (step S65: YES route), the first determination unit 109 determines whether a condition for the packet size is satisfied (step S67). For example, a standard deviation is found for the packets in each turn, such as a standard deviation for the sizes of the first packets, a standard deviation for the sizes of the second packets, and so on. And when the number of turns for which a standard deviation exceeded a threshold value was equal to or greater than a predefined value, it is determined that a condition for the packet size is satisfied.

When the condition for the packet size is not satisfied (step S67: NO route), the processing returns to the calling source processing and returns to the step S9 in FIG. 7 by way of the terminal B. On the other hand, when the condition for the packet size is satisfied (step S67: YES route), the first determination unit 109 determines whether a condition for contents of the data part is satisfied (step S69). For example, the data size of a portion where data is different is found for the packets in each sequence, such as the data size of the portion in the contents of the data part of the first packets, the data size of the portion in the contents of the data part of the second packets and so on. When the number of turns for which the data size of the portion exceeds a threshold value is equal to or greater than a specified value, it is determined that there is variation in the contents of the data part. Alternatively, a total data size of the portions may be found and whether or not that total data size is equal to or greater than a threshold value may be determined.

When the condition for the contents of the data part is not satisfied (step S69: NO route), the processing returns the calling source processing and returns to the step S9 in FIG. 7 by way of the terminal B. On the other hand, when the condition for the contents of the data part is satisfied (step S69: YES route), the second determination unit 110 determines, based on data that is stored in the connection data storage unit 106, whether the difference between the time when the connection packet was obtained and the time when the target packet was obtained is equal to or greater than the third predetermined amount of time (for example, 10 minutes) (step S71).

When the difference between the time when the connection packet was obtained and the time when the target packet was obtained is not equal to or greater than the third predetermined amount of time (step S71: NO route), the processing returns to the calling source processing and returns to the step S9 in FIG. 7 by way of the terminal B. However, when the difference between the time when the connection packet was obtained and the time when the target packet was obtained is equal to or greater than the third predetermined amount of time (step S71: YES route), the connection of the target packet is an RAT communication connection. Therefore, the second determination unit 110 outputs information related to the connection of the target packet (for example, an IP address of the transmission destination and an IP address of the transmission source) to the notification unit 111. Accordingly, the notification unit 111 transmits a notification that includes the information related to the connection of the target packet to the terminal of the system administrator (step S73). The processing then returns to the calling source processing, and returns to the processing of the step S9 in FIG. 7 by way of the terminal B.

As described above, by using a characteristic that the variation in feature values is larger in a connection of RAT communication than in a push notification connection, it is possible to detect RAT communication with high precision. By determining that there is RAT communication only when all of plural conditions related to feature values are satisfied as in this embodiment, it becomes possible to reduce errors in detection.

[Embodiment 4]

Another example of the analysis processing will be explained in the fourth embodiment. The outline of the system and functional blocks of the monitoring apparatus 1 are the same as was explained for the first embodiment.

Figure 18:
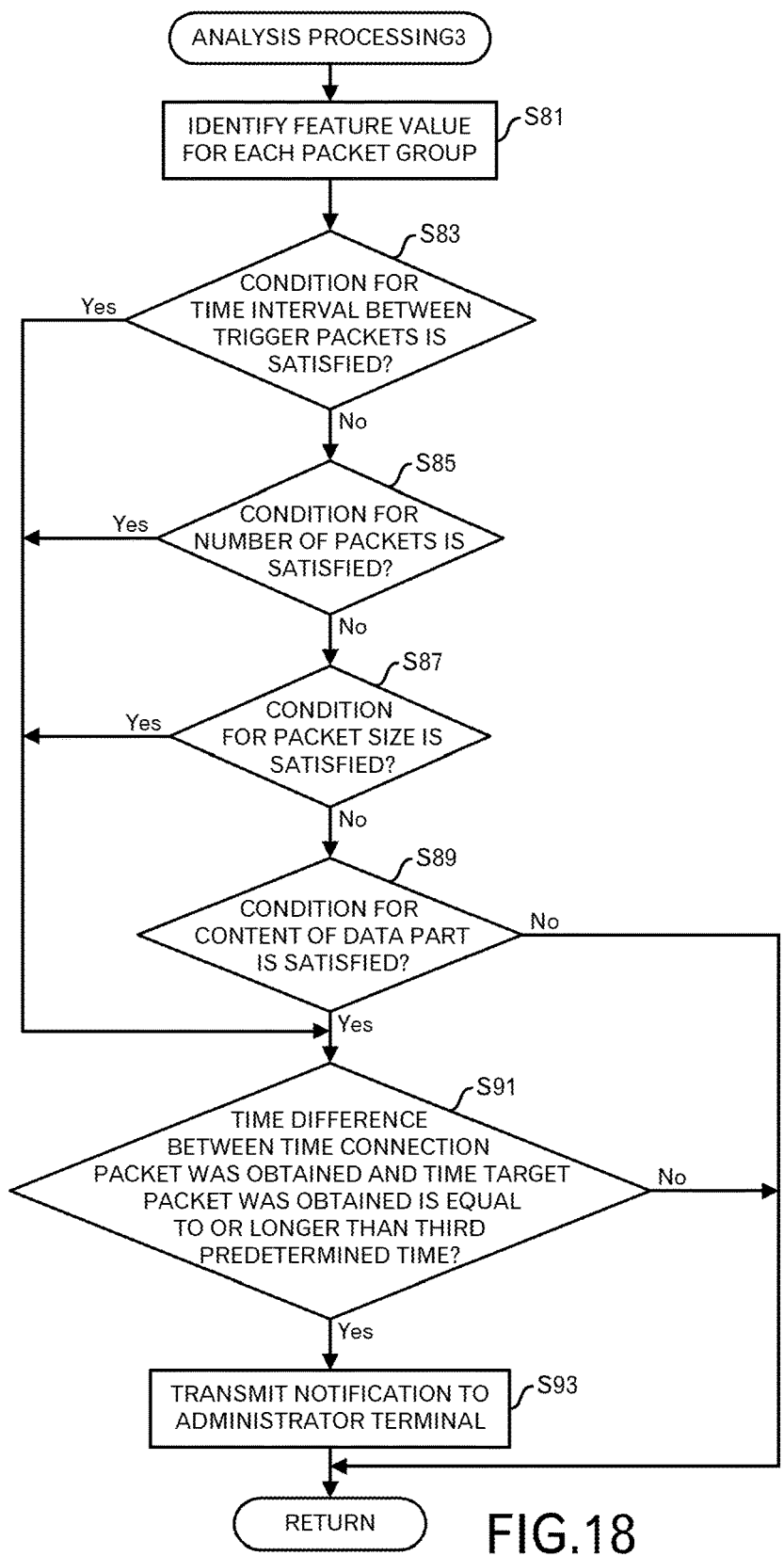
FIG. 18 is a diagram depicting a processing flow of the analysis processing in a fourth embodiment.

The analysis processing of the fourth embodiment will be explained using FIG. 18. First, the calculator 108 in the analyzer 107 identifies feature values from packet group information that is stored in the connection data storage unit 106 for each packet group (FIG. 18: step S81). The feature value is a value that is related to, for example, the time interval between a packet group and a previous or following packet group, the number of packets, contents of the data part of the packet, or the packet size.

The first determination unit 109 determines whether a condition for the time interval between trigger packets is satisfied (step S83). This condition is, for example, a condition that a standard deviation of the time intervals between trigger packets is equal to or greater than a threshold value. The threshold value is, for example, an average value between a standard deviation that was calculated for the time intervals in the case of RAT communication and a standard deviation that was calculated for the time intervals in the case of a push notification.

When the condition for the time interval between trigger packets is satisfied (step S83: YES route), the processing shifts to the step S91. However, when the condition for the time interval between trigger packets is not satisfied (step S83: NO route), the first determination unit 109 determines whether a condition for the number of packets is satisfied (step S85). This condition is, for example, a condition that a standard deviation of the number of packets is equal to or greater than a threshold value. The threshold value is, for example, the average value between a standard deviation that was calculated for the number of packets in the case of RAT communication, and a standard deviation that was calculated for the number of packets in the case of a push notification.

When the condition for the number of packets is satisfied (step S85: YES route), the processing shifts to step S91. However, when the condition for the number of packets is not satisfied (step S85: NO route), the first determination unit 109 determines whether a condition for the packet size is satisfied (step S87). For example, a standard deviation is found for the packets in each turn, such as a standard deviation for the sizes of the first packets, a standard deviation for the sizes of the second packets, and so on. And when the number of turns for which a standard deviation exceeded a threshold value was equal to or greater than a predefined value, it is determined that the condition for the packet size is satisfied.

When the condition for the packet size is satisfied (step S87: YES route, the processing shifts to the step S91. However, when the condition for the packet size is not satisfied (step S87: NO route), the first determination unit 109 determines whether a condition for contents of the data part is satisfied (step S89). For example, the data size of a portion where data is different is found for the packets in each sequence, such as the data size of the portion in the contents of the data part of the first packets, the data size of the portion in the contents of the data part of the second packets and so on. When the number of turns for which the data size of portion where data is different exceeds a threshold value is equal to or greater than a specified number, it is determined that there is variation in the contents of the data part. Alternatively, a total data size of the portions may be found and whether or not that total data size is equal to or greater than a threshold value may be determined.

When the condition for the contents of the data part is not satisfied (step S89: NO route), the processing returns to the calling source processing, and returns to the step S9 in FIG. 7 by way of the terminal B. On the other hand, when the condition for the contents of the data part is satisfied (step S89: YES route), the second determination unit 110 determines, based on data that is stored in the connection data storage unit 106, whether the difference between the time when the connection packet was obtained and the time when the target packet was obtained is equal to or greater than the third predetermined amount of time (for example, 10 minutes) (step S91).

When the difference between the time when the connect ion packet was obtained and the time when the target packet was obtained is not equal to or greater than the third predetermined amount of time (step S91: NO route), the processing returns to the calling source processing, and returns to the step S9 in FIG. 7 by way of the terminal B. However, when the difference between the time when the connection packet was obtained and the time when the target packet was obtained is equal to or greater than the third predetermined amount of time (step S91: YES route), the connection of the target packet is a connection of RAT communication. Therefore, the second determination unit 110 outputs information related to the connection of the target packet (for example, the IP address of the transmission destination and the IP address of the transmission source) to the notification unit 111. Accordingly, the notification unit 111 transmits a notification that includes the information related to the connection of the target packet to the terminal of the system administrator (step S93). Processing then returns to the processing of the calling source, and returns to the step S9 in FIG. 7 by way of the terminal B.

As described above, by using the characteristic that variation in feature values in connections of RAT communication is larger than in connections of push notifications, it becomes possible to detect RAT communication with high precision. By shifting to a determination by the second determination unit 110 when one of plural conditions related to a feature value is satisfied, it becomes possible to suppress missing detection of RAT communication by performing strict determination.

Although the embodiments of this invention were explained above, this invention is not limited to those. For example, the functional block configuration of the monitoring apparatus 1, which is explained above, does not always correspond to actual program module configuration.

Moreover, the aforementioned configurations of the respective tables are mere example, and may be changed. Furthermore, as for the processing flow, as long as the processing results do not change, the turns of the steps may be exchanged or the steps may be executed in parallel.

Moreover, a value other than the standard deviation may be used as a value that represents variation.

The processing may shift to a determination by the second determination unit 110 when two conditions or three conditions of plural conditions related to feature values are satisfied. A transmission direction of a packet may be used as a feature value and whether a condition for the transmission direction is satisfied may be determined.

Figure 19:
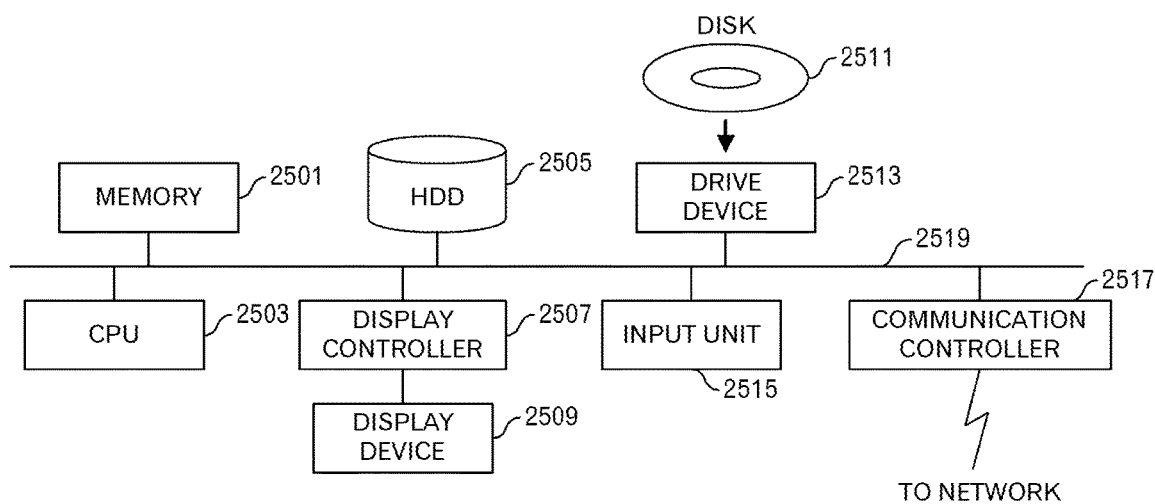
FIG. 19 is a functional block diagram of a computer.

In addition, the aforementioned monitoring apparatus 1 is computer device as illustrated in FIG. 19. That is, a memory 2501 (storage device), a CPU 2503 (processor), a hard disk drive (HDD) 2505, a display controller 2507 connected to a display device 2509, a drive device 2513 for a removable disk 2511, an input unit 2515, and a communication controller 2517 for connection with a network are connected through a bus 2519 as illustrated in FIG. 19. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer device as stated above, the hardware such as the CPU 2503 and the memory 2501, the OS and the application programs systematically cooperate with each other, so that various functions as described above in details are realized.

The aforementioned embodiments are summarized as follows:

A network monitoring apparatus related to a first aspect of embodiments includes: a memory; and a processor configured to use the memory and execute a process. And the process includes: (A) specifying a feature value for each of plural packet groups that were transferred between a first terminal and a second terminal on a connection between the first terminal and the second terminal; calculating a value representing variation in specified feature values; and (B) determining whether the calculated value is equal to or greater than a predetermined threshold value.

A value representing variation in feature values of plural packet groups on a connection of communication related to a targeted attack (for example, RAT communication) is larger than a value that represents variation and is calculated for a connection of normal communication (for example, a push notification). Therefore, by performing processing as described above, it becomes possible to detect communication related to a targeted attack with high precision.

Moreover, the process may further include: (C) determining whether a time difference between a time when a first packet of the connection was obtained and a time when a last packet of the connection was obtained is equal to or longer than a predetermined time, upon determining that the calculated value is equal to or greater than the predetermined threshold value; and (D) outputting information related to the connection, upon determining that the time difference is equal to or longer than the predetermined time. A connection of RAT communication has a characteristic that the connection of RAT communication is kept for a long time. Therefore, by performing processing as described above, it becomes possible to output information related to a connection that is more certain to be RAT communication.

Moreover, the calculating may include (a1) calculating the value for the connection, when an IP address of a connection source of the connection is an IP address in an internal network, an IP address of a connection destination of the connection is an IP address in an external network, and a port number of the connection destination of the connection is a port number representing access to a web server. By performing such processing, it becomes possible to remove a connection, which is not likely to be RAT communication, from a target of processing.

Moreover, the feature value may include at least one of a number of packets included in a packet group, sizes of packets included in the packet group, a time interval between the packet group and another packet group immediately before the packet group, and a value related to contents of data part of packets included in the packet group. By performing such processing, it becomes possible to detect a connection of RAT communication with high precision.

Moreover, the time interval between the packet group and the another packet group may be a time interval between a first packet of the packet group and a first packet of the another packet group.

Moreover, the process may further include: (E) extracting the plural packet groups based on a time when each packet transferred on the connection was obtained.

A network monitoring method related to a second aspect of embodiments includes: (F) specifying a feature value for each of plural packet groups that were transferred between a first terminal and a second terminal on a connection between the first terminal and the second terminal; (G) calculating a value representing variation in specified feature values; and (H) determining whether the calculated value is equal to or greater than a predetermined threshold value.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A network monitoring apparatus, comprising:
a memory; and
a processor configured to use the memory and execute a process, the process comprising:
specifying, for each of a plurality of packet groups and from the plurality of packet groups, a feature value relating to a targeted attack, wherein each of the plurality of packet groups includes a plurality of packets that were communicated between an internal terminal and an external terminal on a connection between the internal terminal and the external terminal;
calculating, for the plurality of packet groups, a value of a standard deviation of feature values specified for the plurality of packet groups;
determining whether the calculated value is equal to or greater than a predetermined threshold value as an indication of the targeted attack; and outputting an alert regarding the targeted attack, after determining that the calculated value is equal to or greater than the predetermined threshold value, wherein the feature value includes at least one of a number of packets included in a packet group of the plurality of packet groups, a size of one or more packets included in the packet group, a time interval between the packet group and another packet group immediately before the packet group, and a value related to contents of data part of the plurality of packets included in the packet group, wherein the calculating is executed, when an IP address of a connection source of the connection is an IP address in an internal network, an IP address of a connection destination of the connection is an IP address in an external network, and a port number of the connection destination of the connection is a port number representing access to a web server.

2. The network monitoring apparatus as set forth in claim 1, wherein the process further comprises determining whether a time period from a time when an initial packet of the connection was obtained is equal to or longer than a predetermined time, upon determining that the calculated value is equal to or greater than the predetermined threshold value, and the outputting is executed after determining that the time period is equal to or longer than the predetermined time.

3. The network monitoring apparatus as set forth in claim 1, wherein the time interval between the group and the another group is a time interval between an initial packet of the group and an initial packet of the another group.

4. The network monitoring apparatus as set forth in claim 1, wherein the process further comprises extracting plural packets to be included in each of the plurality of groups based on a time when each packet transferred on the connection was obtained.

5. A non-transitory computer-readable storage medium storing a program for causing a computer to execute a process, the process comprising:

specifying, for each of a plurality of packet groups and from the plurality of packet groups, a feature value relating to a targeted attack, wherein each of the plurality of packet groups includes a plurality of packets that were communicated between an internal terminal and an external terminal on a connection between the internal terminal and the external terminal;

calculating, for the plurality of packet groups, a value of a standard deviation of feature values specified for the plurality of packet groups;

determining whether the calculated value is equal to or greater than a predetermined threshold value as an indication of the targeted attack; and outputting an alert regarding the targeted attack, after determining that the calculated value is equal to or greater than the predetermined threshold value, wherein the feature value includes at least one of a number of packets included in a packet group of the plurality of packet groups, a size of one or more packets included in the packet group, a time interval between the packet group and another packet group immediately before the packet group, and a value related to contents of data part of the plurality of packets included in the packet group, wherein the calculating is executed, when an IP address of a connection source of the connection is an IP address in an internal network, an IP address of a connection destination of the connection is an IP address in an external network, and a port number of the connection destination of the connection is a port number representing access to a web server.

6. The non-transitory computer-readable storage medium as set forth in claim 5, wherein the process further comprises determining whether a time period from a time when an initial packet of the connection was obtained is equal to or longer than a predetermined time, upon determining that the calculated value is equal to or greater than the predetermined threshold value, and the outputting is executed after determining that the time period is equal to or longer than the predetermined time.

7. The non-transitory computer-readable storage medium as set forth in claim 5, wherein the time interval between the group and the another group is a time interval between an initial packet of the group and an initial packet of the another group.

8. The non-transitory computer-readable storage medium as set forth in claim 5, wherein the process further comprises extracting plural packets to be included in each of the plurality of groups based on a time when each packet transferred on the connection was obtained.

9. A network monitoring method, comprising:

specifying, by using a computer, for each of a plurality of packet groups and from the plurality of packet groups, a feature value relating to a targeted attack, wherein each of the plurality of packet groups includes a plurality of packets that were communicated between an internal terminal and an external terminal on a connection between the internal terminal and the external terminal;

calculating, by using the computer, for the plurality of packet groups, a value of a standard deviation of feature values specified for the plurality of packet groups;

determining, by using the computer, whether the calculated value is equal to or greater than a predetermined threshold value as an indication of the targeted attack; and outputting, by using the computer, an alert regarding the targeted attack, after determining that the calculated value is equal to or greater than the predetermined threshold value, wherein the feature value includes at least one of a number of packets included in a packet group of the plurality of packet groups, a size of one or more packets included in the packet group, a time interval between the packet group and another packet group immediately before the packet group, and a value related to contents of data part of the plurality of packets included in the packet group, wherein the calculating is executed, when an IP address of a connection source of the connection is an IP address in an internal network, an IP address of a connection destination of the connection is an IP address in an external network, and a port number of the connection destination of the connection is a port number representing access to a web server.

10. The network monitoring method as set forth in claim 9, wherein the process further comprises determining, by using the computer, whether a time period from a time when an initial packet of the connection was obtained is equal to or longer than a predetermined time, upon determining that the calculated value is equal to or greater than the predetermined threshold value, and the outputting is executed after determining that the time period is equal to or longer than the predetermined time.

11. The network monitoring method as set forth in claim 9, wherein the time interval between the group and the another group is a time interval between an initial packet of the group and an initial packet of the another group.

12. The network monitoring method as set forth in claim 9, wherein the process further comprises extracting plural packets to be included in each of the plurality of groups based on a time when each packet transferred on the connection was obtained.

* * * * *